Dec. 17, 1957 W. J. VITKA 2,816,508
ROTARY PUMP
Filed May 4, 1956 2 Sheets-Sheet 1
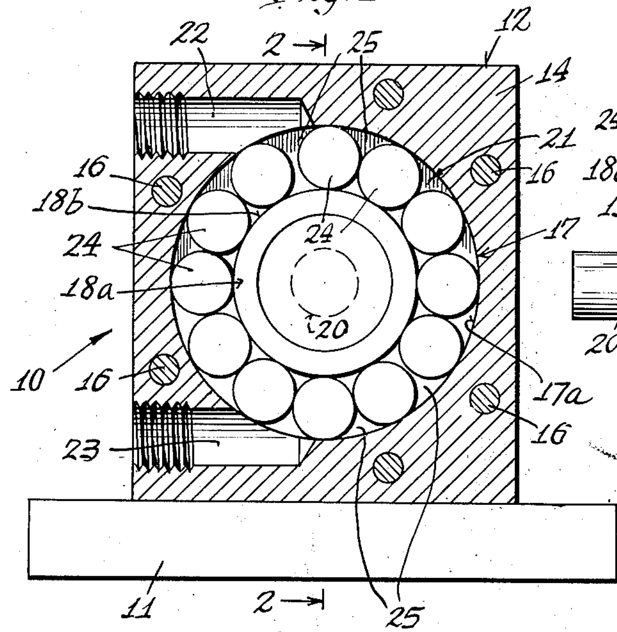
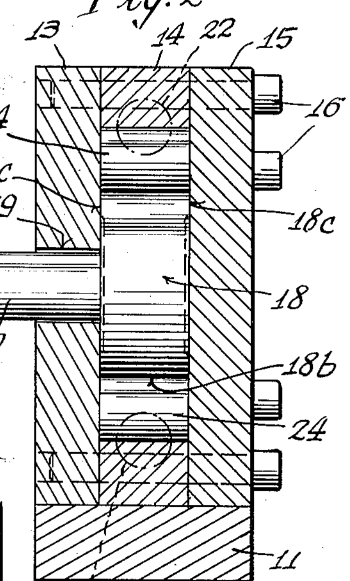
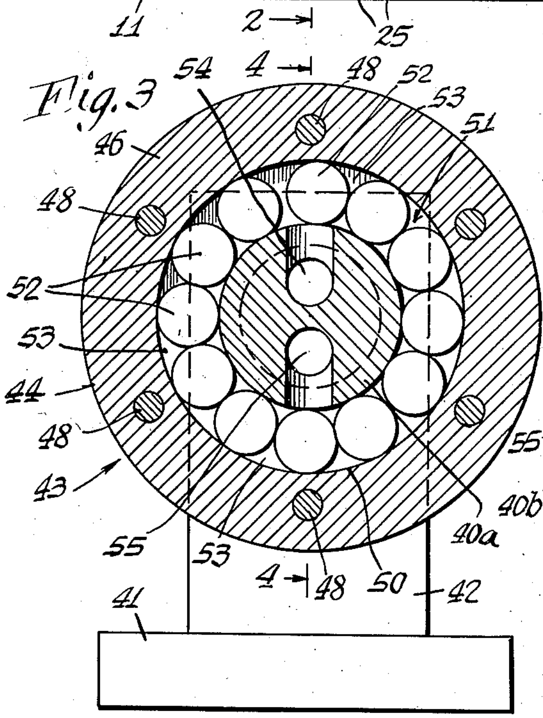
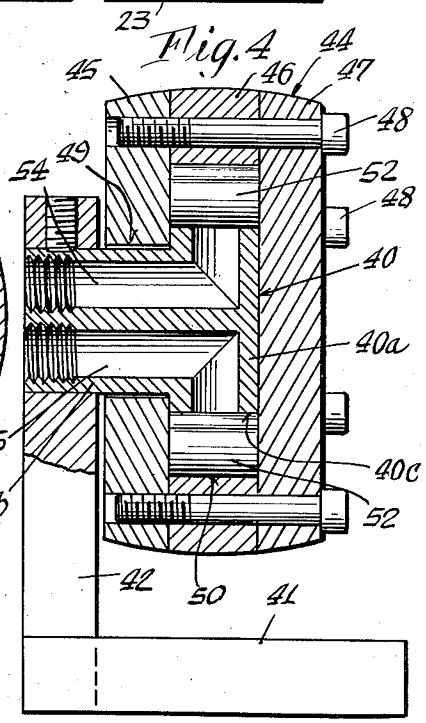
INVENTOR.
William J. Vitka
BY
Johnson and Kline
ATTORNEYS Dec. 17, 1957 W. J. VITKA 2,816,508
ROTARY PUMP
Filed May 4, 1956 2 Sheets-Sheet 2
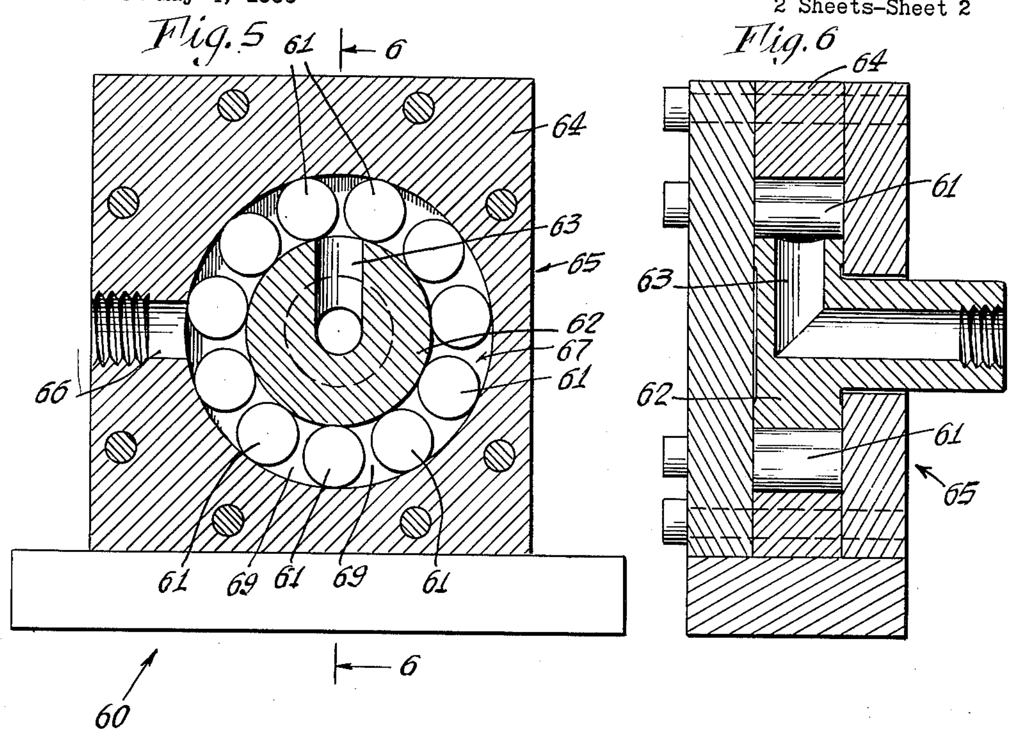
INVENTOR.
William J. Vitka
BY
Johnson and Kline
ATTORNEYS United States Patent Office 2,816,508
Patented Dec. 17, 1957

2,816,508

ROTARY PUMP

William J. Vitka, Stratford, Conn.

Application May 4, 1956, Serial No. 582,855
1 Claim. (Cl. 103—83)

This invention relates to a fluid pump or motor, and more particularly to a new and novel rotary pump capable of efficiently handling either liquid or gaseous fluids.

In order for a rotary pump, whether it be of the vane, gear or screw type, to operate at continued volumetric efficiency it required the maintenance of very close clearances or tolerances between the rubbing surfaces thereof. As there were heretofore no known methods or means for satisfactorily controlling or packing the rubbing surfaces thereof to compensate for wear resulting from the inherent friction of the moving parts within the pump, leakage occurred. For this reason rotary pumps were considered to be generally impractical for the handling of fluids such as clear water or gases. Therefore, the rotary pumps heretofore known were generally restricted to the field of pumping oil or other viscous liquids having a lubricating quality and/or sufficient viscosity to avoid excessive leakage resulting from wear. Because of the structural limitations of the rotary pumps heretofore known, these pumps were usually limited to relatively small or moderate capacities and operated at relatively low speeds.

An object of this invention is to overcome the above disadvantages common or inherent in rotary pumps by providing an improved rotary pump in which the friction between the moving parts thereof is maintained at an absolute minimum, thereby reducing leakage due to wear which greatly increases the useful life of the pump.

Another object of this invention is to provide a rotary pump capable of efficiently handling a liquid or gaseous fluid wherein a portion of the fluid stream entering the pump is isolated and sealed from leakage and the trapped or isolated portion of the fluid is positively displaced with a minimum of frictional loss to compress or evacuate the same.

Another object of this invention is to provide a rotary pump in which the pump is provided with a natural functioning valving means which positively locks out the fluid until required, thereby automatically controlling the entrance and discharging of the fluid therefrom.

Another object of this invention is to provide a rotating pump which is capable of reversing itself.

According to this invention, the above objects are accomplished by a rotary pump operating on the principle of at least two rolling members working between two surfaces having relative motion and concentrically disposed to form an annular, sealed chamber, the rolling member being press-fitted between the two surfaces to form tightly sealed pockets for isolating and sealing a portion of the fluid entering the chamber. The relative movement of the two surfaces is transmitted to the rolling members to move the latter in a natural manner within the chamber with a minimum of friction so that the trapped, sealed and isolated portion of the fluid is positively displaced for compressing or evacuating the same from the pump.

In general, the novel fluid pump or motor of this invention consists of a rotor and stator in which the rotor is connected to the stator for relative rotation therewith, the stator and rotor being concentrically spaced to form an annular concentric chamber having an inlet and discharge port. Disposed within the chamber is a plurality of rolling members which are press-fitted between the annular wall surfaces of the rotor and stator to form a plurality of tightly sealed pockets within the chamber. Hence, upon rotation of the rotor by suitable power means, the rotor functions as a driver for driving the individual rolling members in a circular motion relative to the relative movement of the rotor. The movement of the rolling members in passing the inlet port functions as a valve means to successively shear a portion of the fluid stream entering the chamber, the sheared portion of the fluid stream being trapped or isolated within the tightly sealed pockets formed between rolling members. Continued rotation of the rolling members effects positive displacement of the trapped portion of the fluid to compress or evacuate the same through the discharge port, the speed of rotation and relative movement of the component members affecting the kinetic energy of the fluid to produce a pressure differential within the chamber setting up a flow through the pump.

A feature of this invention resides in the provision that the improved pump according to this invention is relatively inexpensive to manufacture, rugged in construction and positive in operation.

Another feature of this invention resides in the provision that the cooperation of the rolling members with respect to the inlet and outlet ports can be such that the direction of flow through the pump can be controlled by the direction of rotation of the rolling members.

Another feature of this invention resides in the provision that the improved pump can more efficiently handle gaseous fluids as well as liquids.

Other features and advantages will be apparent from the specification and claim when considered in connection with the drawings, in which:

Figure 1 is a front sectional view of the improved pump.

Fig. 2 is a sectional view taken along line 2—2 of Fig. 1.

Fig. 3 is a front elevational sectional view of the modified form of the invention.

Fig. 4 is a sectional view taken along line 4—4 of Fig. 3.

Fig. 5 is a front sectional view of still another modified form of the invention.

Fig. 6 is a sectional view taken along line 6—6 of Fig. 5.

In the form of the invention illustrated in Figs. 1 and 2, the improved fluid pump or motor comprises a stator 10 consisting of a base plate 11 supporting a rotor housing 12. As shown, the housing 12 is made up of a plurality of plate members 13, 14 and 15 which are securely fastened together by a plurality of fasteners 16 extending transversely therethrough to form a relatively rugged structure, the juxtaposed face portions of the respective plate members being smoothly finished to form a fluid-tight seal in the assembled position. The plate members making up the housing constitute simply a pair of end plates 13 and 15 having disposed therebetween an intermediate plate 14, the latter having a circular opening 17 extending therethrough. With the plate members in assembled position, as illustrated in Fig. 2, it will be noted that the opening of the intermediate plate forms a recess on the interior of the housing which is adapted to receive a rotor 18, one of the end plates 13 being provided with an aperture 19 through which a driving shaft 20 adapted to be connected to any suitable power source, not shown, connects the rotor 18.

According to this invention, the rotor 18 is concentrically disposed within the recess. As shown in Figs. 1 and 2, the rotor 18 consists of a circular disk or wheel 18a having a smooth outer periphery or surface 18b having a width substantially equal to the width of the recess, the diameter of the disk or wheel being smaller than the diameter of the opening. Thus, an annular pumping chamber 21 is formed between the outer periphery of the disk and the wall portion 17a of the recess. In order that the chamber 21 may be sealed against possible leakage along the sides thereof, the face portion 18c of the rotor extending around the peripheral edge thereof is smoothly formed and in frictional engagement with the adjacent surfaces of the end plates 13 and 15. Therefore, when the rotor 18 is rotated during operation of the pump or motor, the peripheral edge portions thereof form a fluid-tight seal with the surfaces of the end plates.

In order that a fluid may be directed into and out of the pumping chamber, there is provided an inlet and discharge port or passageway 22 and 23 respectively extending through the middle plate in free communication with the annular chamber 21. As shown, the inlet and discharge port 22 and 23 are oppositely disposed. According to this invention, the inlet passageway 22 connects the chamber 21 with the ambient air of the atmosphere or to any other suitable source of fluid supply while the discharge port 23 connects the chamber to a suitable source of demand (not shown) or the atmosphere.

Disposed about the rotor 18 between the outer periphery 18b thereof and the wall 17a of the recess are a plurality of rolling members 24 which are press-fitted into frictional engagement with the peripheries of the rotor and stator recess. Because the rolling members 24 are press-fitted in the chamber between the peripheries of the rotor and stator recess, it will be noted that the contacting surface of the rolling members therewith partitions the pumping chamber 21 into a plurality of tightly sealed pockets 25, the latter being formed between each pair of rolling members. While at least two such rolling members are sufficient to render the pump or motor of the instant invention operative, it will be noted that any number of rollers may be used. As illustrated in the particular embodiment of Figs. 1 and 2 and for the purposes of illustration, twelve such rolling members are shown. While the rolling members may be spaced from each other, in the illustrated form the rolling members are in contact with each other. Further, it is to be noted that the rolling members 24 need not be limited to cylindrical rollers as shown and it is within the scope of this invention to have the rolling members take the forms of spheres, cones or the like.

Operation of the pump according to this invention requires that the rolling members be in sealing relationship with the peripheries of the rotor and stator so that fluid-tight sealed pockets are formed therebetween, the ends of the rolling members also being in sealing relationship with the surfaces of the end plates. To render the pump operative, the rotor 18 is set in rotation by any suitable power means, not shown. As the rolling members 24 are in rolling contact with the rotor and stator, rotation of the rotor drives the rolling member 24 so that the latter naturally revolves about the rotor 18 in the direction of rotation. Thus, for example, if the rotor 18 is rotated in a clockwise direction, the rolling members 24, although individually rotated in a counterclockwise direction about their own axes, nevertheless move in a clockwise direction about the axis of the rotor. With this construction, it has been discovered that by increasing the rotary speed of the rotor, thus effecting the relative speed of the rolling members, a negative pressure is produced at the inlet port 22 causing the source fluid to flow therethrough. As each rolling member 24 is successively driven past the inlet port opening 22, it will be noted that the stream of fluid entering the intake passageway 22 is valved or sheared by the succeeding rolling members 24 rotating past the intake port. Consequently, the sheared portion of the fluid stream is trapped within the pockets 25 formed by each pair of succeeding rolling members moving beyond the intake port. As the rolling members continue to revolve about the rotor 18 and moving in the direction of rotation thereof, the pockets 35 formed by the succeeding rolling members 24 are positively displaced in the direction of rotation and carry along therewith the trapped or isolated portions of the fluid. Because of the centrifugal force or velocity imparted to the trapped fluid in the pockets and the action of the rolling member thereon, the kinetic energy of the trapped fluid is increased and produces a pressure differential within the chamber so that a flow through the pump is established. As each pocket and trapped fluid therein is positively displaced and is brought into communication with the discharge port 23, the fluid pressure built up within the pockets 25 causes the fluid to be exhausted or evacuated through the discharge port, and the flow of fluid flowing through the pump is established.

In the form of the invention illustrated in Fig. 1, it has been discovered by experiment that in order to avoid any tendency of the pump to pulsate, i. e. to avoid any possibility of the fluid to exhaust through the inlet port, the inlet and outlet ports may be connected to suitable valve means (not shown) whereby the flow through the pump may be controlled by proper valve settings, therefore eliminating pulsation or unintentional reversal of fluid flow.

In this form of the invention, it will be noted that the flow through the pump may be readily reversed simply by reversing the direction of rotation of the rotor. If the inlet and discharge ports 22 and 23 respectively are provided with valve means, naturally the valves will have to be regulated so that the flow may be established in the reverse direction.

Therefore according to this invention the pressure differential established within the pump becomes a function of the speed of rotation of the rotor and the relative movement of the rolling members therewith. As a result of the construction herein described, it will be noted that the amount of friction between the moving parts of the pump is reduced to a minimum since the moving parts thereof are in rolling friction. Consequently, the amount of wear on the moving parts thereof is reduced to a minimum. Furthermore, since the contacting surfaces of the rolling members 24 are press-fitted between the peripheries of the rotor and the stator, a fluid-tight seal is formed along the contact surfaces thereof. Accordingly, the pump described is suitable for efficiently pumping gaseous fluid as well as light liquids.

The modification illustrated in Figs. 3 and 4 embodies the same principle as described, except that the rotor is disposed on the exterior of the stator. As illustrated, the stator 40 is supported on a base plate 41 having connected thereto a perpendicularly disposed support member 42 to which the stator 40 is connected. As illustrated, the stator 40 of this form of the invention comprises a stator hub 40a and a laterally disposed extension 40b which is adapted to be secured to the supporting member 42, the stator hub 40a having a smoothly formed periphery 40c.

Rotatably supported about the stator hub 40a is a stator housing 43 which in this form of the invention constitutes the rotor 44. As shown, the rotor 44 comprises a plurality of plate members 45, 46 and 47 which are disposed about the stator hub 40a and securely fastened by suitable fasteners 48. The rotor 44 comprises a pair of end plate members 45 and 47 disposed on either side of the hub, one of the plates 45 having an aperture 49 for accommodating the stator extension 40b and an intermediate plate 46 which is provided with a circular opening 50 having a diameter larger than that of the stator hub, the stator hub 40a being concentrically disposed within the opening 50. Consequently, the space formed between the stator hub **40*a* and the wall portions of the opening constitutes the annular pumping chamber 51**.

In this form of the invention, as in the one previously described, a plurality of rolling members 52 forming sealed pockets 53 are disposed in the pumping chamber 51, the rolling members 52 being disposed about the stator hub **40*a* in frictional engagement therewith, as by press-fitting the same between the hub and the internal periphery of the rotor recess 50**.

In order for the fluid to enter and discharge from the pumping chamber, the stator hub **40*a* is provided with an intake passage or port 54 and a discharge passage or port 55**, the ports being oppositely disposed as viewed in Fig. 3.

In operation the modified form of Figs. 3 and 4 is similar to that as herein described. Any suitable power means or belt drive means may be utilized to actuate the rotor 44 to rotate the same. The rotation of the rotor 44 in turn drives the rolling members 52 to effect positive displacement of the same so that the fluid entering the fluid chamber through inlet 54 is trapped or isolated in the pockets formed by the succeeding rolling members whereby the trapped or isolated fluid is then positively displaced about the stator hub **40*b***. As hereinbefore described, the velocity or centrifugal force acting upon the trapped or isolated fluid increases the kinetic energy thereof to produce a pressure differential.

In the modification illustrated in Figs. 5 and 6, the construction of the pump 60 is similar to that as illustrated in Figs. 1 and 2 with the exception that the rolling members 61 are illustrated in spaced relationship to each other and the rotor 62 is provided with an inlet port 63 while the middle plate 64 of the stator housing 65 is provided with a discharge port 66. Therefore, in this form of the invention, the characteristic of pulsation which requires the utilization of the valve control means for facilitating the direction of flow is not required.

In this form of the invention as the rotor 62 is rotated, the intake passageway or port 63 communicating with the annular chamber 67 of the pump is rotated at a relatively greater rate of speed than the rolling members 61 moving about the periphery of the rotor 62. Therefore, as the inlet passageway 63 rotates to communicate successively with the individual pockets 69 formed between successive rolling members 61, the fluid entering the chamber therethrough is trapped between succeeding pairs of rolling members and positively displaced until the pockets and trapped fluid carried therein are brought into communication with the discharge opening 66 to exhaust or evacuate the fluid from within the pockets. Experience with this embodiment shows that a substantial pressure differential is established and that differential is increased by increasing the rotation speed of the rotor.

Variations and modifications may be made within the scope of the claim and portions of the improvements may be used without others.

I claim:

In a device for moving fluid, a housing having side walls and spaced concentric walls forming a fluid-tight chamber, one of said concentric walls being connected to the side walls and the other of said concentric walls being rotatable with respect to the side walls and the other concentric wall, said housing having inlet and outlet ports, the outlet port being spaced at least 180° part from the inlet port in the direction of rotation of said rotatable concentric wall, a plurality of angularly spaced cylinders positioned in the chamber with the ends thereof in sealing relation with said side walls and the peripheries thereof in rolling sealing relation with the concentric walls and forming a plurality of pockets within the chamber, and means for rotating said rotatable wall portion and causing said cylinders to move in the direction of rotation of said rotatable wall and to rotate on their own axis with the leading edge of the cylinder moving in a direction toward the outlet port and the trailing edge of the cylinder moving away from the inlet port whereby the action of the surface drag of the cylinders on the fluid causes the fluid to be moved into and out of the pockets through said inlet and outlet ports.

References Cited in the file of this patent

UNITED STATES PATENTS

| | | |
|---|---|---|
| 1,265,070 | Feyzes | May 7, 1918 |
| 1,455,252 | Jackson | May 15, 1923 |
| 1,700,038 | Feuerheerd | Jan. 22, 1929 |
| 2,588,342 | Bidwell | Mar. 11, 1952 |
| 2,589,449 | Stageberg | Mar. 18, 1952 |

FOREIGN PATENTS

| | | |
|---|---|---|
| 47,795 | Netherlands | Feb. 15, 1940 |
| 342,561 | Great Britain | Feb. 5, 1931 |
| 426,318 | Italy | Oct. 23, 1947 |